United States Patent [19]
Warter

[11] Patent Number: 5,848,653
[45] Date of Patent: Dec. 15, 1998

[54] ROOT PICK

[76] Inventor: Steve Warter, 6900 Hovingham Ct., Centerville, Va. 22020

[21] Appl. No.: 749,485

[22] Filed: Nov. 13, 1996

[51] Int. Cl.$^6$ ........................................................ A01B 1/00
[52] U.S. Cl. ............................................. 172/381; 172/371
[58] Field of Search ..................................... 172/371–381, 172/308.1, 308.3

[56] References Cited

U.S. PATENT DOCUMENTS

| | | |
|---|---|---|
| 55,623 | 6/1866 | Collier . |
| 665,871 | 1/1901 | Brooks ..................................... 172/375 |
| 669,395 | 3/1901 | Riddle ................................. 172/378 X |
| 698,715 | 4/1902 | Knight ..................................... 172/378 |
| 1,156,937 | 10/1915 | Sinnott ..................................... 172/375 |
| 1,182,918 | 5/1916 | McQuaide . |
| 1,278,680 | 9/1918 | Klaffert . |
| 1,326,108 | 12/1919 | Seelye ..................................... 172/375 |
| 1,908,735 | 5/1933 | Donaldson ............................. 294/49 X |
| 1,998,314 | 4/1935 | Gilstrap et al. . |
| 2,553,327 | 5/1951 | Norman . |
| 2,716,538 | 8/1955 | Arrowood . |
| 3,226,149 | 12/1965 | McJohnson .......................... 172/375 X |
| 3,680,641 | 8/1972 | Hein . |
| 3,782,770 | 1/1974 | Lee ...................................... 172/378 X |
| 4,396,214 | 8/1983 | Lesche . |
| 4,489,795 | 12/1984 | Leidy . |
| 5,109,930 | 5/1992 | Napier . |
| 5,211,118 | 5/1993 | Perkins ..................................... 111/7.1 |
| 5,257,666 | 11/1993 | Townsend, Jr. .......................... 172/378 |
| 5,360,071 | 11/1994 | Bergendorf .............................. 172/378 |
| 5,411,101 | 5/1995 | Bonavitacola ....................... 172/375 X |

*Primary Examiner*—Michael J. Carone
*Assistant Examiner*—Victor Batson
*Attorney, Agent, or Firm*—Dowell & Dowell, P.C.

[57] ABSTRACT

A heavy duty, earth-working implement including an elongated handle having a wedge-shaped head mounted thereto which extends upwardly from a cutting blade along a continuously curved back surface which functions as a fulcrum to assist in prying rocks and other earth buried debris, which fulcrum terminates in a ledge which is aligned with the cutting block of the head so that a driving tool may be used to strike the ledge to thereby facilitate penetration of the cutting blade of the tool.

5 Claims, 1 Drawing Sheet

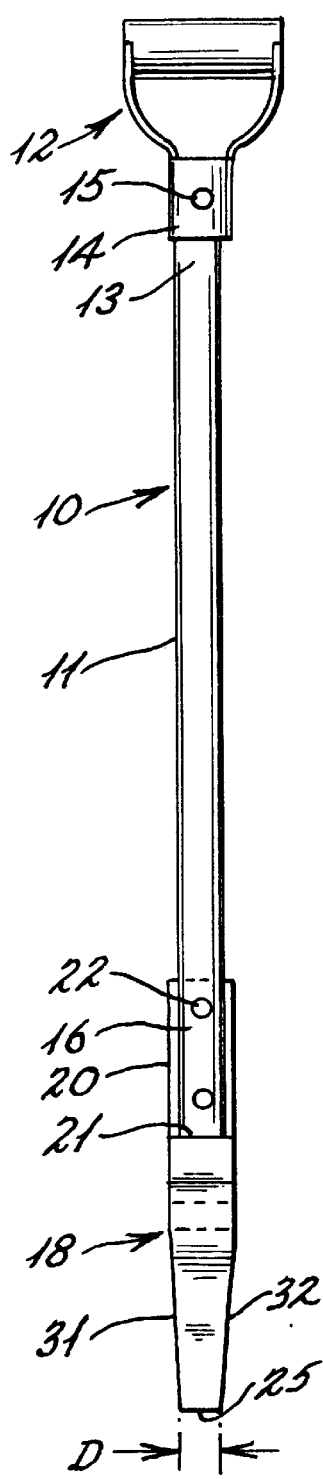
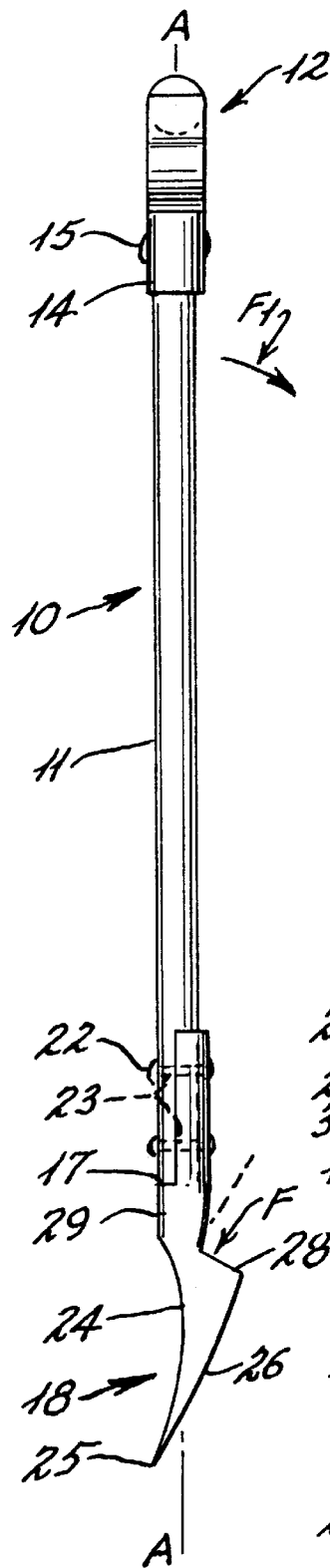
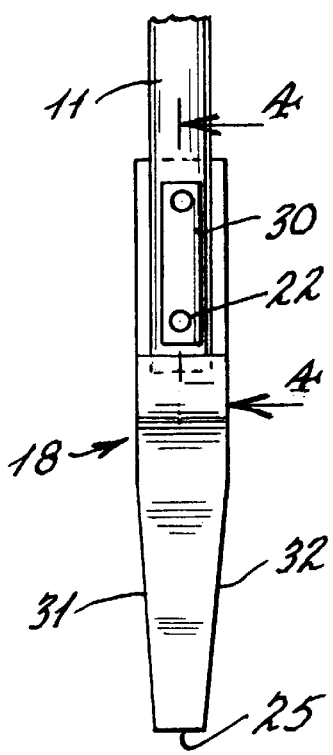
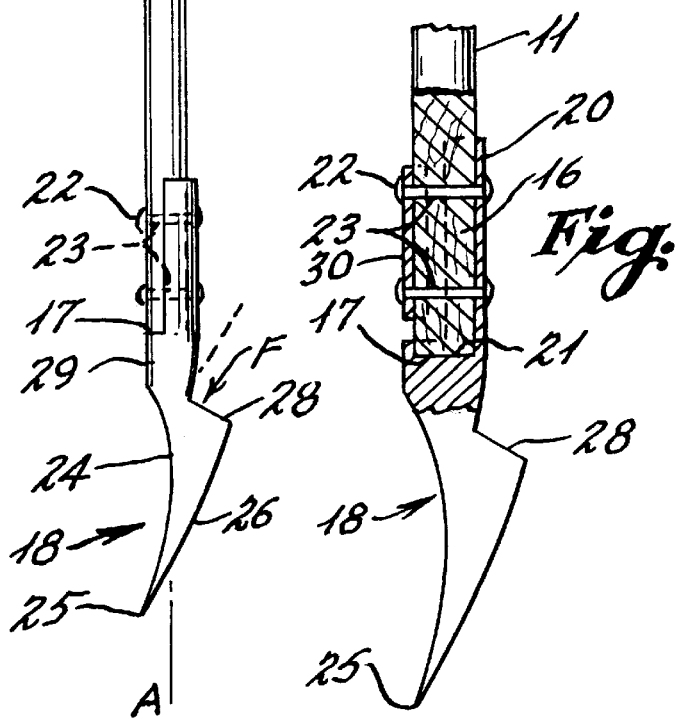

ROOT PICK

BACKGROUND OF THE INVENTION

1. Field of the Invention

This invention is generally directed to handheld earth working implements which include earth working or root cutting blades which are mounted to elongated handles which provide leverage for facilitating their use. More particularly, the present invention is directed to a handheld earth working implement which functions both as a root pick and as a lifting or prying tool which is specifically configured to allow the tool to be driven by impact with a sledge hammer or other impacting implement when especially difficult obstacles are encountered by the cutting blade of the tool.

2. History of the Related Art

There have been numerous handheld earth working implements which have been designed for facilitating soil penetration, root cutting, rock removal and related earth working functions. Conventional pick-type axes are designed to have one or more cutting blades which are mounted to the end of an elongated handle similar to an axe handle with the implement being wielded by swinging the head of the implement over the shoulder and toward the ground. Some such picks have been designed to provide relatively narrow cutting blades which can be utilized to cut through roots. Unfortunately, the use of such implements is difficult and awkward, especially due to the swinging motion which is necessitated to supply sufficient force to cut through buried matter in the ground. Furthermore, the accuracy of which the cutting blade can be applied is limited due to the swinging motion required of the tool. Conventional pick axes have also been utilized as leverage devices even though they are not constructed for this purpose. Individuals will frequently drive one end of a pick axe into the ground adjacent an object which must be removed and thereafter apply force against the handle to pry the object from the ground. Due to the distance at which the point of the tool is spaced from the axis of the handle, the force applied to the handle can result in a fracturing of the handle before the object is loosened or removed.

To provide a handheld tool which can be utilized so that a cutting blade is more accurately controlled than a conventional pick axe, some implements have been designed to have a cutting blade which is mounted so as to extend axially with respect to the handle of the implement. By way of example, in U.S. Pat. No. 1,908,735 to Donaldson, a weed removing implement is disclosed having an elongated handle to which a forged or stamped head is mounted which converges to a cutting blade. The upper portion of the blade is provided with foot engaging portions which may be utilized to apply pressure to the tip of the blade when driving the blade into soil. The blade is also slightly arched so that the back surface thereof is only slightly curved, however, the blade terminates in a receiver in which a portion of the handle is lodged, which receiver interferes with the use of the blade as a continuous fulcrum for raising especially heavy objects from the soil.

In U.S. Pat. No. 1,998,314 to Gilstrap et al., a weed puller and remover is disclosed which also includes a blade having a slightly curved rear surface, which blade is mounted to an elongated handle. Mounted adjacent the upper portion of the blade are a pair of reversely curved rake fingers or prongs. The raking prongs, however, interfere with the use of the tool as a leveraging device for prying rocks and other heavy objects from the soil. Further, the device is generally designed to be lightweight and its use in cutting into the soil is limited by the amount of force that can be applied along the length of the handle.

In U.S. Pat. No. 2,716,538 to Arrowood, a soil loosening implement is disclosed which includes a lightweight cutting blade mounted to a bracket-like support element which extends from the rear of the cutting blade and forms a rounded fulcrum for assisting in creating leverage when utilizing the implement to pry plants from the soil. The tool, however, is not designed to apply a great deal of force to the cutting blade and therefore the amount of force is limited to that which can be applied either by stepping on the bracket associated with the tool as the tool is placed into a rocking motion or by the amount of force that could be applied to the handle of the tool. It should also be noted that the bracket formed at the upper end of the cutting tool limits the use of the blade for prying objects at the ground level. The bracket prevents continuous pivoting from the cutting blade along the length of the tool which is necessary in especially tight areas. Further, because of this configuration, the leverage point is spaced well distanced from the cutting blade which requires an additional force to be applied to obtain the necessary lift benefit at the blade.

In U.S. Pat. No. 4,489,795 to Leidy, a heavy duty digging iron is disclosed which is designed to be utilized for cutting subsurface obstacles, such as roots. The tool is heavy and is provided with an insulating material to prevent shock in the event subsurface electrical wires are engaged during use. The tool, however, does not provide any means for utilizing the implement for leveraging objects from the ground.

In view of the foregoing, there remains a need to provide an earth working implement which can not only be utilized for controlled heavy duty subsurface digging and cutting but also can be utilized to provide leveraging of objects without damaging the implement during use. There is further a need to provide an implement which can have an extraordinary amount of additional force applied thereto for purposes of driving a cutting blade into the soil or through an object, such as a root, without damaging the tool.

SUMMARY OF THE INVENTION

The present invention is directed to a heavy duty, handheld earth working implement which may normally weigh between eight to ten pounds or more and which includes an elongated handle having a D-shaped handgrip positioned at one end thereof and a heavy duty cast earth working head of a general wedge-shaped configuration which is bolted or otherwise mounted to the opposite end thereof. The wedge-shaped head includes a mounting sleeve which may be bolted or otherwise secured to one end of the handle and which is integrally formed with a cutting blade formed at the opposite end thereof. The blade is designed so that the rear surface thereof curves upwardly from the cutting edge to a generally flat shoulder or ledge which extends inwardly towards the axis of the handle and provides a driving surface which can be engaged by a hammer, sledge or other driving tool. The ledge is aligned generally with the cutting edge of the blade so that when force is applied thereto, the force is directly applied in line with the cutting blade. The rear surface of the tool functions as a continuous fulcrum which is uninterrupted and allows the tool to be pivoted from the blade to the impacting surface. The cutting blade is aligned slightly offset with respect to the axis of the handle so that when the implement is utilized for prying, most of the force from the handle of the implement will be directed to the mounting sleeve which extends upwardly at least along the rear portion of the head. The front portion of the head extending from the cutting blade is preferably generally concavely formed to facilitate earth penetration when the tool is in use.

It is the primary object of the present invention to provide a handheld earth working implement having a cutting blade which can be utilized not only for penetrating hardened earthen areas but also which can used to cut through roots and other subsurface matter.

It is also an object of the present invention to provide a combination earth working implement which may be utilized for both cutting subsurface objects and also for prying objects wherein the cutting blade is designed so that the rear edge thereof forms a continuous fulcrum which is unobstructed and which allows a continuous pivoting action of the implement about its cutting blade.

It is also an object of the present invention to provide an earth working implement having a heavy duty wedge-shaped head having a cutting blade which is generally aligned with an impact surface integrally formed with the implement head which may be impacted by a sledge or other device to thereby drive the cutting blade through thick subsurface objects, including heavy roots, without causing damage to the implement.

BRIEF DESCRIPTION OF THE DRAWINGS

A better understanding of the present invention will be had with reference to the accompanying drawings wherein:

FIG. 1 is a front perspective view of the earth working implement of the present invention;

FIG. 2 is a left side view of the implement of FIG. 1;

FIG. 3 is a partial front plan view of the cutting blade portion of a second embodiment of the implement of the present invention; and FIG. 4 is a cross-sectional view taken along line 4—4 of FIG. 3.

DESCRIPTION OF THE PREFERRED EMBODIMENT

With continued reference to FIGS. 1 and 2, the first embodiment of the present invention is shown wherein the handheld earth working implement 10 includes an elongated handle 11 preferably formed of wood but which may be also formed of a composite plastic reinforced material. A generally D-shaped hand engaging portion 12 is mounted adjacent the upper end 13 of the handle and is secured thereto by a metallic sleeve 14 which is connected by a rivet or bolt 15. The length of the handle may vary between approximately 30" to 48" in length with 36" being preferred.

Mounted to the lower end portion 16 of the handle is the implement working head 18 which is integrally formed from cast iron or other metal. The implement head includes a mounting sleeve 20 which may be generally semi-cylindrical in configuration as shown in the drawing figures or may be tubular in configuration, allowing the lower portion 16 of the handle to be completely seated therein. As shown in the drawing figures, the handle abuts a first ledge 21 which is of a size to completely cover a lower surface 17 of the handle 11. A pair of bolts or rivets 22 are provided through openings 23 through the lower portion of the handle and serve to mount the working head 18 thereto.

As shown in FIG. 2, the working head 18 is generally wedge-shaped in configuration and includes a forward concave surface 24 which extends to a cutting blade 25 which may vary in width dimension "D". The cutting blade is preferably slightly offset with respect to the elongated axis A—A of the handle.

The rear surface 26 of the implement head is slightly concavely and continuously curved from the cutting blade 25 upwardly to a ledge portion 28 which extends inwardly and slightly upwardly towards the lower end 16 of the handle. The ledge 28 is formed so as to extend generally perpendicularly with respect to the cutting blade 25 so that if a force is applied, as shown by the arrow "F" in FIG. 2, the force is directed generally in alignment with the blade. The ledge 28 is designed and is of a size to allow a conventional sledge to be impacted thereagainst to drive the cutting blade 25 through an object. By orienting the ledge 28 so that all the force "F" is directed to the cutting blade 25, it is ensured that the force is directed to the point of contact of the cutting blade with an object, thus preventing rotation of the implement relative to the cutting blade when force is applied. It should be further noted that the neck portion 29 of the implement tapers inwardly at the inner edge of the ledge 28 to provide further clearance for a sledge or other driving or impacting implement being driven against the surface thereof.

With respect to FIGS. 3 and 4, a slight variation in the implement is disclosed. In this embodiment, a secondary mounting plate 30 is provided along the forward portion of the handle 11 through which the rivets or mounting bolts 22 extend. In this embodiment, the stress from the bolts is distributed more evenly with respect to the fiber of the wood along the lower portion 16 of the handle 11.

It is preferred that the implement weigh between approximately eight to twelve pounds, with most of the weight being provided by the integrally formed implement head 18. The tool includes no outer projections from the head with the exception of the ledge 28 which is provided for purposes of allowing force to be applied by another tool, such as a sledge, for driving the cutting blade 25 for cutting purposes or for earth penetration.

It should be noted that each of the sides 31 and 32 of the implement head 18 are generally smooth and taper slightly inwardly relative to one another along the lower portion of the implement head from the ledge 28 towards the cutting blade 25, as shown in FIG. 1. This allows for the cutting blade to be utilized in very narrow spaces.

The implement is not only useful for cutting roots and other subsurface objects and penetrating hardened soil, but the blade may also be utilized for prying or shifting rocks, logs or other objects. The rear surface 26 of the implement is continuously curved from the cutting blade 25 to the ledge 28 providing a continuous fulcrum about which the tool may be pivoted. Therefore, an immediate lifting force is applied at the cutting blade when the handle is tilted in the direction of arrow "F1" in FIG. 2. Unlike prior art devices, it is not necessary to develop additional force by providing a fulcrum which is spaced at a distance from the cutting blade as was previously mentioned with respect to the U.S. patent to Arrowood.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A handheld earth working implement for use in penetrating soil and cutting subsurface objects and for prying objects, the implement comprising, an elongated handle having upper and lower end portions, an integrally formed and solid working head mounted to said lower end portion of said handle, said working head including a lower cutting blade and a front face and a rear face, said rear face extending from said cutting blade upwardly toward an inwardly extending ledge and being generally continuously arcuate and convexly configured along its length so as to provide a continuous fulcrum beginning at said cutting blade about which the implement may be pivoted, said ledge extending generally perpendicularly with respect to said cutting blade and extending inwardly and toward said lower portion of said handle and said ledge defining a flat surface adapted to be impacted by a separate driving tool, said implement head including opposite sides which taper inwardly relative to one another toward said cutting blade from said adjacent said ledge, and said sides terminating at said rear surface and said front surface of said working head.

2. The handheld implement of claim 1 in which said lower portion of said handle includes a lower surface, said working head includes another ledge which abuts and covers said lower surface of said lower portion of said handle, a mounting sleeve extending upwardly from said another ledge relative to said handle and means for mounting said sleeve to said lower portion of said handle.

3. The handheld implement of claim 2 wherein said implement head is formed of a cast metal material.

4. The handheld implement of claim 2 in which said working head is generally wedge-shaped.

5. The handheld implement of claim 1 in which said working head is generally wedge-shaped.

\* \* \* \* \*